Oct. 13, 1925.
A. G. LEAKE
1,557,462
HOIST
Filed Nov. 12, 1924   2 Sheets-Sheet 1
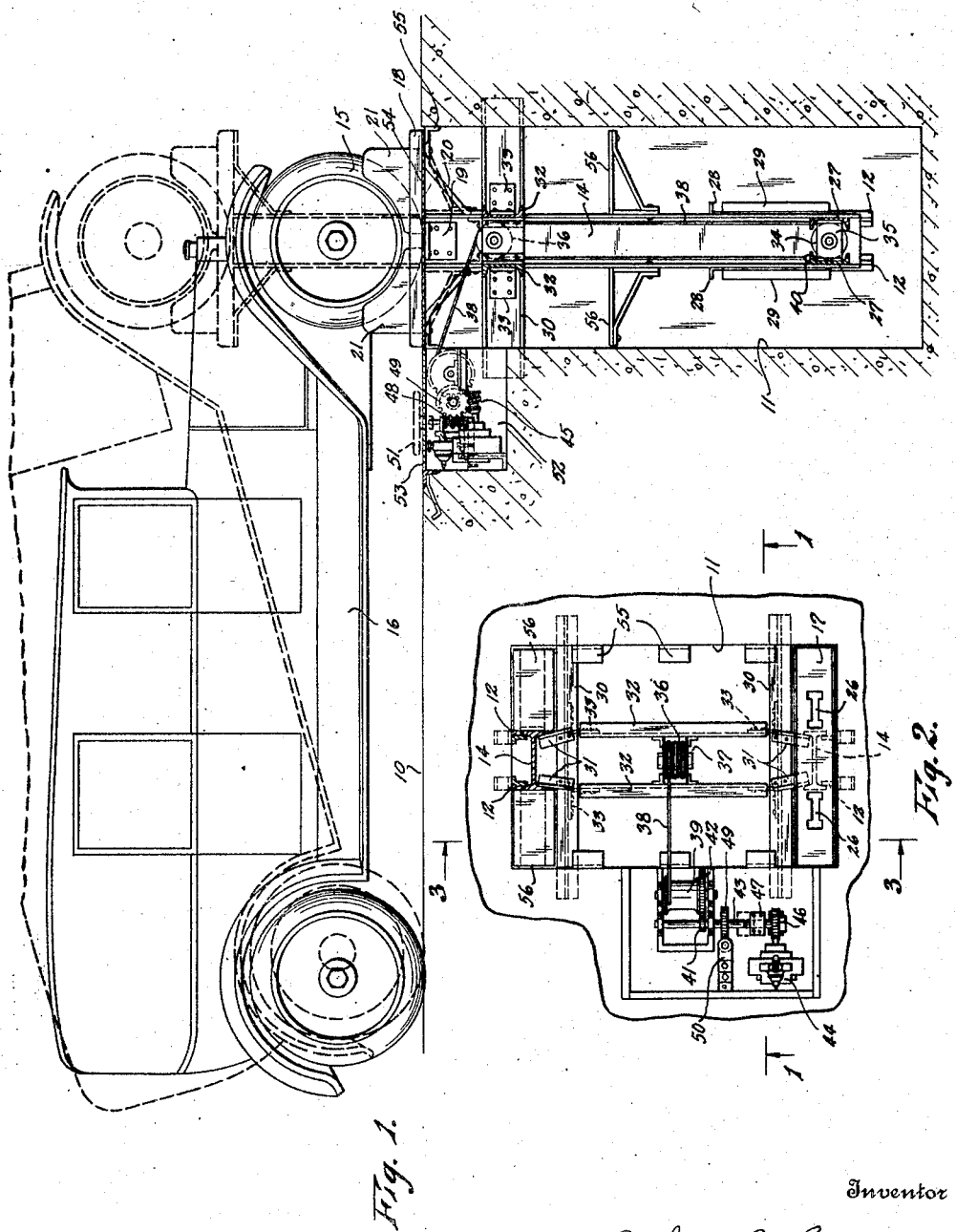
Inventor
Arthur G. Leake
By Wooster & Davis
Attorneys Oct. 13, 1925.
A. G. LEAKE
HOIST
Filed Nov. 12, 1924
1,557,462
2 Sheets-Sheet 2
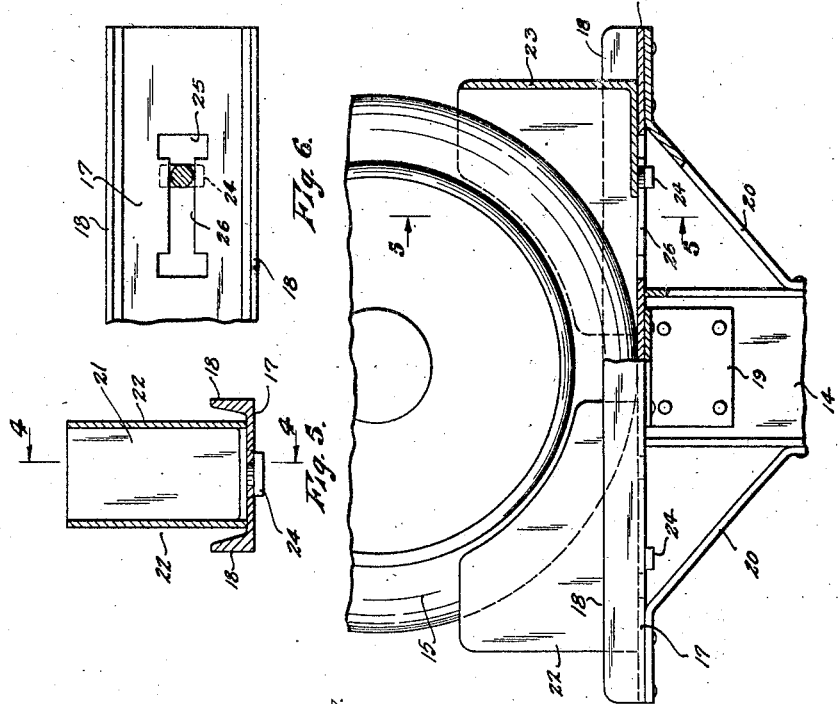
Inventor
Arthur G. Leake
By Wooster & Davis
Attorneys Patented Oct. 13, 1925.

1,557,462

UNITED STATES PATENT OFFICE.

ARTHUR G. LEAKE, OF BRIDGEPORT, CONNECTICUT.

HOIST.

Application filed November 12, 1924. Serial No. 749,388.

*To all whom it may concern:*

Be it known that I, ARTHUR G. LEAKE, a citizen of the United States, residing at Bridgeport, county of Fairfield, State of Connecticut, have invented a new and useful Hoist, of which the following is a specification.

This invention relates to automobile hoists or lifts which are especially adapted for use at service stations or garages to lift one end of an automobile to allow easy access to the under side thereof for inspection or repair purposes, and has for an object to provide a device of this character which will be very simple in construction, may be manfactured almost entirely from standard structural shapes so that it may be made at minimum expense, which will be efficient and reliable in operation and not likely to be easily gotten out of order.

It is also an object of the invention to construct a device of this character which when not in use will be practically below the floor or grade level where it is out of the way, and where the wheels of the automobile to be lifted may be run directly onto the supports.

With the foregoing and other objects in view, I have devised the construction illustrated in the accompanying drawings forming a part of this specification, similar reference characters being employed throughout the various figures to indicate corresponding elements. In these drawings, Fig. 1 is a vertical section through my improved hoist installed, the section being substantially on line 1—1 of Fig. 2, and an automobile to be lifted being shown in elevation.

Fig. 2 is a top plan view of the hoist with the cover plates removed.

Fig. 3 is a vertical section substantially on line 3—3 of Fig. 2.

Fig. 4 is a partial side elevation and partial section of one of the wheel supports, the section being substantially on line 4—4 of Fig. 5.

Fig. 5 is a transverse section through one of the wheel supports, the section being substantially on line 5—5 of Fig. 4, and Fig. 6 is a top plan view of one end of one of the wheel supports.

This improved hoist or lift is constructed to be mounted below the floor of a garage or below grade where it is placed out of doors, so that when not in use it is entirely out of the way and will not interfere with other operations in the vicinity and will not occupy valuable space. Also by placing it below grade the car may be run directly onto the lift without running it up an incline or raised devices. This lift is of the type designed for lifting one end of an automobile to give access to the under side thereof while the wheels at the other end run on the grade. It is also very simple in construction and is so designed that it may be made almost entirely of standard structural shapes.

In the present embodiment grade is indicated at 10, which may be the floor of a garage or the ground level of an outside installation, and the lifting mechanism is mounted in a pit 11, the walls of which may be of any suitable material such as concrete. Mounted in this pit, preferably at the opposite ends thereof, are suitable upright guides 12, in the present case T-bars although other shapes may be employed if desired, and these bars are held in a rigid upright position by any suitable means, such as short Z-bars 13 embedded in the concrete and to which the guide bars are secured. The hoist proper comprises a pair of upright supports 14 preferably of I-beam construction, there being one of these supports for each of the two wheels 15 at either end of the automobile 16 to be operated upon, and the flanges at one side of these I-beams engage the guides 12 and are guided thereby. Each of these supports carries at its upper end a wheel support 17, preferably in the form of a channel iron with its flanges 18 extending upwardly as shown. These supports are attached to the upper end of the supports 14 by suitable angle plates 19 and the opposite ends are supported by braces 20. The flanges 18 form guide walls at the opposite edges of these supports for the wheels 15 of the car and will prevent their sliding off. They also provide lateral stop means for the wheel stops 21. These stops may be of various constructions but are preferably castings, substantially as shown, to seat between the flanges 18, and have side walls 22 and end walls 23 to engage the sides and front or rear of the wheel to prevent their running off the support 17. They are removably and adjustably secured to the supports by any suitable means, such as a transverse head 24 on the under side thereof arranged to pass through a transverse opening 25 in the bottom wall of the supports 17 and communicating with a longitudinal slot 26, and thus are placed in position as shown in Figs. 4 and 5. The clamping action of the head 24 on the supports 17 will hold the stops in the proper location.

At their lower ends the upright supports 14 are connected by a transverse beam, in the present instance composed of two spaced channel irons 27. These supports are also connected above these channel irons by angle irons 28 and are braced by suitable inclined angle irons 29. This makes a rigid strong construction and maintains the upright supports in proper relation. Adjacent the upper end of the pit are a pair of supporting beams, such as I-beams 30, extending across the pit and embedded at their opposite ends in the concrete walls of the pit. These beams also carry guides 31, such as angle plates which are secured to these beams and engage the inner flanges of the upright supports 14 to provide additional guiding means therefor. Extending between the beams 30 is another transverse beam preferably composed of a pair of channel irons 32 secured to the beams by any suitable means, such as angle plates 33. The channel irons 27 are spaced from each other so as to carry suitable pulley wheels 34 mounted in suitable supports 35, and the channel irons 32 are also spaced to carry between them pulley wheels 36 mounted on suitable supports 37. A flexible cable 38 runs over these pulleys and to a rotatable drum 39 whereby the supports 14 may be raised and lowered. In the present showing the other end of the cable is connected to one of the lower channel irons 27.

Suitable mechanism is provided for operating the drum 39 to wind up and unwind the cable for the purpose of raising and lowering the hoist, such as a pinion 41 meshing with a gear 42 connected to the drum, the pinion 41 being carried by a shaft 43 which may be operated either by hand or by any suitable motor 44. This motor may be either electrical, hydraulic, air or any other suitable type that is found desirable or convenient, and may be connected to the shaft 43 by a suitable worm and gear drive 45—46. The gear 46 may be connected to the shaft 43 with a detachable coupling 47 so that if the motor fails for any reason it may be disconnected from the drum and the drum operated by hand by another worm and gear drive 48—49. The worm 48 may be mounted on a shaft carried in a suitable bracket 50 which may be mounted so that the worm may be moved to and from engagement with the gear 49. Thus when the motor is used to operate the drum this hand drive is disconnected, it being intended for use only in emergencies, the worm 48 being operated by any suitable hand means as a crank or wheel 51. It will be noted that by using the worm and gear drive the hoist is always rigidly held in any given position when the power is turned off. The motor and drum are preferably mounted in a small pit or chamber 52 at one side of the main pit 11 and immediately below the surface of the floor where they are easily accessible for inspection, oiling and repair.

The tops of the pits are closed or covered with suitable cover plates 53 and 54, suitable supporting means being provided therefor. The cover plate 54 may be mounted on suitable angle iron brackets 55 and extends between the wheel supports 17. Of course, when these wheel supports are moved upwardly as the hoist is raised there will be a space left between the ends of this cover and the sides of the pit. This will be closed by suitable cover plates 56 carried by the upright supports 14 at a suitable distance below their upper ends, so that as these supports are raised to their maximum extent these plates will move into the openings left by the wheel supports 17.

In operation the wheels of the automobile, either at the front or rear end as desired, are run directly onto the supports 17 from grade, and the stops 21 are then placed in position to the front and rear of these wheels. The hoist may then be moved upwardly to raise the end of the automobile by winding the cable 38 on the drum 39. Any desired ratio may be secured by using greater or less numbers of pulley wheels 34 and 36, as will be obvious, so that a very small motor will do the work properly, and also that the device may be easily operated by hand, if desired.

Having thus set forth the nature of my invention, what I claim is:

1. In an automobile service lift, a pair of spaced upright supports, a pair of wheel supports carried by said upright supports, stationary guides for the upright supports, a cross beam connecting said supports adjacent the lower ends thereof, pulleys carried by said beam, a stationary support adjacent the upper ends of the upright supports, pulleys carried by the stationary support, a rotary drum, a flexible cable running over said pulleys and drum, and means for operating the drum.

2. In an automobile service lift, a pair of spaced upright supports, a pair of wheel supports carried by said upright supports, stationary guides for the upright supports, a cross beam connecting said supports adjacent the lower ends thereof, pulleys carried by said beam, a stationary cross beam spaced above said first mentioned beam, pulleys carried by the stationary beam, a rotary drum, a flexible cable running over the pulleys and drum to raise and lower the upright supports, and means for operating the drum.

3. In an automobile service lift, upright stationary guides mounted in a pit below grade, a pair of spaced upright movable supports guided by said guides, a pair of wheel supports mounted at the upper ends of the upright supports, a cross beam connecting the upright supports adjacent their lower ends, a stationary cross beam mounted in the pit adjacent the upper end thereof, pulleys carried by said beams, a rotary drum, means for rotating the drum, and a flexible cable running over the drum and pulleys to raise and lower the upright supports.

4. In an automobile service lift, upright stationary guides mounted in a pit below grade, a pair of spaced upright movable supports having flanges engaging said guides, a cross beam connecting said upright supports adjacent the lower ends thereof, a pair of wheel supports mounted at the upper ends of the upright supports, spaced beams extending across the pit adjacent the upper end thereof and forming guides for the upright supports, a cross beam carried by said spaced beams, a rotary drum, pulleys carried by the cross beams, a flexible cable running over the drum and pulleys to raise and lower the supports, and means for operating the drum.

5. In an automobile service lift, upright stationary guides mounted in a pit below grade, a pair of spaced upright movable supports guided by said guides, a pair of wheel supports mounted at the upper ends of the upright supports, a cover for the upper end of the pit between the wheel supports, closures carried by the upright supports below the wheel supports to close the openings left by the wheel supports when they are raised, and means for raising and lowering the upright supports.

6. In an automobile service lift, upright stationary guides mounted in a pit below grade, a pair of spaced upright movable supports guided by said guides, a pair of wheel supports mounted at the upper ends of the upright supports, said supports having elongated slots therein, wheel stops arranged to engage the front and rear of the wheels and having headed projections to extend through the slots and secure the stops to the supports, and means for raising and lowering the supports.

In testimony whereof I affix my signature.

ARTHUR G. LEAKE.